United States Patent [19]

Perkins et al.

[11] Patent Number: 4,602,240

[45] Date of Patent: Jul. 22, 1986

[54] APPARATUS FOR AND METHOD OF ATTENUATING POWER LINE CARRIER COMMUNICATION SIGNALS PASSING BETWEEN SUBSTATION DISTRIBUTION LINES AND TRANSMISSION LINES THROUGH SUBSTATION TRANSFORMERS

[75] Inventors: William C. Perkins, Sachse, Tex.; Keh-Wen Whang, St. Louis, Mo.

[73] Assignee: General Electric Company, King of Prussia, Pa.

[21] Appl. No.: 592,139

[22] Filed: Mar. 22, 1984

[51] Int. Cl.⁴ .................... H04M 11/04; H01F 33/00; H01F 40/10

[52] U.S. Cl. .............................. 340/310 R; 323/361

[58] Field of Search ........................ 340/310 R, 310 A; 323/361; 336/5

[56] References Cited

U.S. PATENT DOCUMENTS

| | | | |
|---|---|---|---|
| 4,433,284 | 2/1984 | Perkins | 323/361 |
| 4,458,236 | 7/1984 | Perkins | 340/310 R |
| 4,473,816 | 9/1984 | Perkins | 340/310 R |

Primary Examiner—Douglas W. Olms
Assistant Examiner—Frank M. Scutch, III
Attorney, Agent, or Firm—William Freedman

[57] ABSTRACT

A shunt three-phase wye-connected capacitor bank is connected intermediate a substation transformer and any source of zero-sequence power line carrier communication signals being transmitted on the substation distribution network to partially alleviate unbalance conditions in the communication signals which in the balanced condition are not passed by a three-phase substation transformer to the main transmission line. The signal is further attenuated by connecting the common wye-point of the capacitor bank through an inductance to neutral to form a shunt element of either an L or pi attenuation circuit with the series inductance of the substation transformer and the transmission line inductance forming the serial elements of the L or pi circuit. A further shunt element at another substation distribution network completes the attenuation circuit for the pi configuration.

9 Claims, 2 Drawing Figures

APPARATUS FOR AND METHOD OF ATTENUATING POWER LINE CARRIER COMMUNICATION SIGNALS PASSING BETWEEN SUBSTATION DISTRIBUTION LINES AND TRANSMISSION LINES THROUGH SUBSTATION TRANSFORMERS

THE INVENTION

The present invention is generally related to electrical signals and more specifically related to communication frequency signals superimposed on electric power distribution lines. Even more specifically the invention is related to attenuating crosstalk between substation distribution networks of zero-sequence power line carrier communication signals intended solely for use on a specific substation electrical power distribution network.

BACKGROUND

For energy management purposes, it is important to be able to perform control and monitoring operations (e.g., operating relays and reading electrical power usage meters) of events in an electrical power distribution network from one or more centralized points. In today's technology, this is typically accomplished by using low frequency (3–10 kHz) zero-sequence distribution power line carrier (PLC) communication signals to perform communication with various receivers and transceivers in the substation distribution network. If everything is balanced and under ideal conditions, zero-sequence signals generated within a substation distribution network will not pass through the typical delta-wye substation transformer to the main transmission line. However, due to often unbalanced load conditions and other factors such as transmission line inductances and other reactances, conditions can arise which are favorable to standing wave conditions on the main transmission line at the communication signal frequency which conditions reinforce the amplitude of any unbalanced signals and increase problems from crosstalk via the transmission lines between distribution substations.

Conventional methods used in the prior art to isolate substation transformers from main transmission line PLC circuits operating at high frequency (50–150 kHz) employ components installed directly on the transmission line at correspondingly high voltage, requiring high basic impulse (insulation) level equipment such as parallel-resonant traps tuned to the PLC frequency. Because main transmission line PLC frequencies are comparatively high, the reactive components of such traps are correspondingly small and either require no special disconnect and protection equipment, or that existing for other purposes can be shared. Also, these communication systems typically use only a single conductor rather than all three phase conductors as used in substation distribution lines associated with this invention thus using filter parts for only a single line.

When such conventional prior art signal trapping methods are applied to control distribution PLC signals on substation distribution circuits from reaching the main transmission lines, problems arise. Where the PLC signals are in the neighborhood of 5 kHz, as in one embodiment of the invention, the high voltage and basic impulse level equipment requirements are the same, but the lower PLC frequency used requires reactive components which are correspondingly larger and involve correspondingly lower impedances at the basic power line frequency. Series reactive elements therefore draw correspondingly greater power line frequency currents, thus multiplying the necessary volt-ampere rating and resultant cost of these elements. Moreover, the resulting volt-ampere product requires separate and correspondingly more expensive disconnect and protection devices. Comparatively lower reliability as compared to the prior art solution for high frequency PLC signals also results from the greater component stress requirements of the higher transmission volt-ampere product. The resulting high cost of such a solution as typically used in the prior art ordinarily cannot be as readily justified for the substation distribution PLC function as it can for main transmission line PLC.

If the main transmission line is to be used for communications in addition to distribution communications, the signal trapping using the conventional prior art methods would have to use frequency sensitive bandpass methods so as not to interfere with the main line communication signals. Bandpass attenuation circuits are normally more complicated and thus more expensive and less reliable than either high pass or low pass attenuation circuits.

In view of the above, the present invention attempts to control distribution communications crosstalk between substations by preventing the PLC frequency signals from ever getting to the main transmission line in the first place. This is accomplished by placing a capacitor bank intermediate the substation transformer and any communication equipment on that substation network where the capacitor bank is essentially a shunt to communication frequency signals and yet has a relatively high impedance to the 50 or 60 Hz power frequency. As mentioned supra, if the conditions of no unbalanced feeder phase loading exists, the zero-sequence PLC communication signals will never be transmitted through the substation transformer to the main transmission line.

A further factor for attenuating the PLC frequency signals to or from the transmission line involves connecting an inductance between the common wye-point of the capacitor bank and line neutral to form the shunt element of an L-type attenuation circuit where the series impedance of the substation transformer and the series impedance of the transmission line forms the series element of the L-configured attenuation network. If another substation has a capacitor bank and inductive element configured as just mentioned, this will constitute the other shunt element of a pi attenuator network. However, in both cases the shunt attenuator element of the attenuator network is physically located on the substation distribution network and thus will not in any way interfere with the higher frequency communication signals that may be used only on the main transmission line. This approach eliminates the design problems of cost and reliability inherent in prior art approaches to trapping PLC signals at transmission voltage levels.

In view of the above discussion, it is an object of the present inventive concept to provide an improved attenuator circuit for reducing substation distribution power line carrier communication signal crosstalk via transmission lines between distribution substations.

Other objects and advantages of the present invention will be apparent from reading the specification and appended claims in conjunction with the drawings wherein;

FIG. 1 is a simplified single-line schematic (idealized) of the attenuator network either for the L configuration or the pi configuration; and FIG. 2 is a schematic diagram representative of a segment of transmission line and having two illustrated substation distribution networks each having a shunt attenuator element.

DETAILED DESCRIPTION

Figure 1:
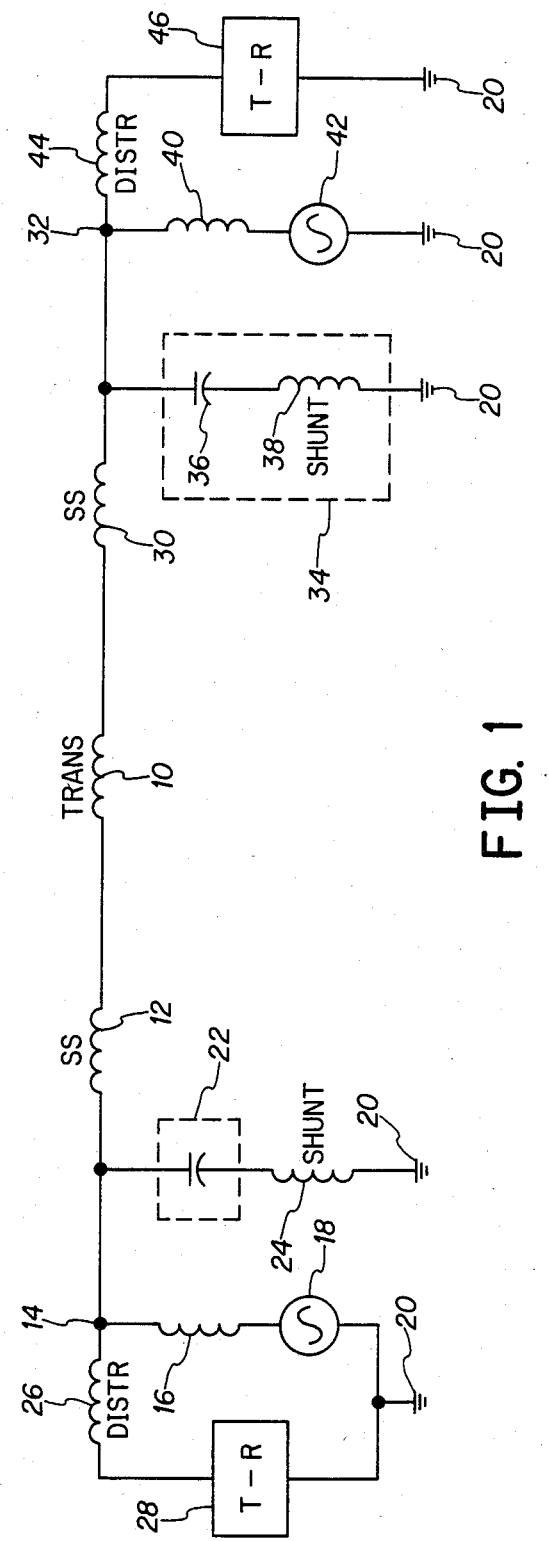

In FIG. 1 a main high voltage transmission line is represented by an inductance 10 which is connected to a substation transformer equivalent series inductance 12. The other end of inductance 12 is connected to a common junction point 14 which is connected through an inductance 16 and a signal generator 18 to neutral or ground 20. Junction point 14, representing the associated substation distribution operating bus, is also connected through a capacitive element shown within a dash line block 22. The capacitive element within block 22 is connected through a shunt inductive impedance 24 to ground or neutral 20. Junction point 14 is also connected through an inductance 26 representing the series impedance of the three-phase substation distribution network to one or more transceivers or other communication receiving devices 28 which communication device is also connected to ground 20. The transmission line represented by inductance 10 is also connected through a substation transformer equivalent series inductance 30 to a junction point 32. Junction point 32, representing the associated substation distribution operating bus, is connected through a shunt impedance element in dash line block 34 to show that this block is optional. The block contains a capacitive element 36 and an inductive element 38. Although the ground or neutral to which this element is connected is physically distance separated from ground 20, the ground is intended to be the same and will be labeled with identical numbers for explanation purposes. Junction point 32 is also connected through a series equivalent impedance 40 and a signal generator or communication device 42 to ground or neutral 20. Finally, junction point 32 is connected through a further series inductance 44 representative of the distribution lines and transformers for the righthand substation network and through a transceiver or other communication receiving device 46 to ground 20.

Figure 2:
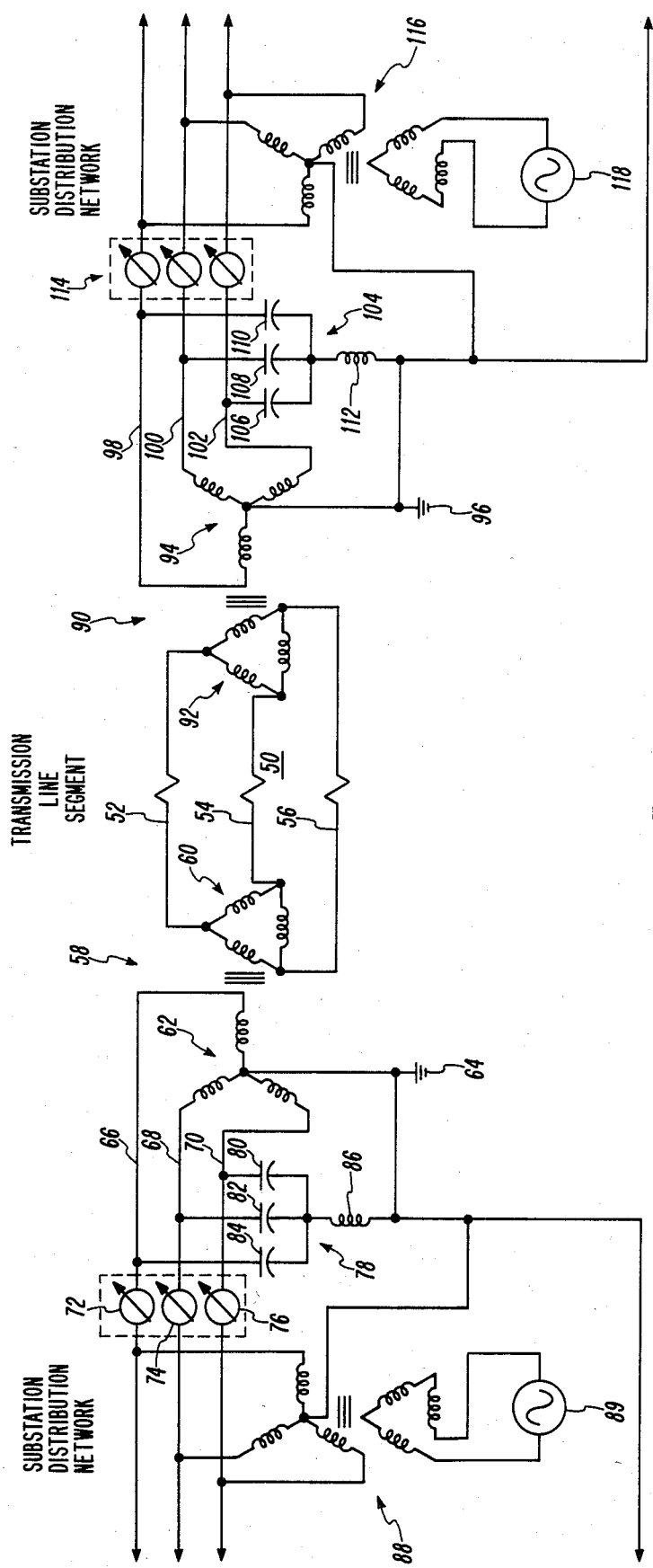

In FIG. 2 a three-phase transmission line segment generally indicated as 50 contains the three conductors 52, 54 and 56. This transmission line segment is represented generally by the inductance 10 in FIG. 1. At one end of the transmission line 50 there is a three-phase substation transformer generally designated as 58 having a primary winding 60 and a secondary winding 62. The primary winding is connected in a delta configuration while secondary winding 62 is connected in a grounded-wye type configuration. The common point of the wye (wye-point) is connected to ground 64. The three-phase lines connected to secondary winding 62 are labeled with designators 66, 68 and 70. These three lines are shown to have optional voltage regulators designated as 72, 74 and 76 respectively. A capacitor bank generally designated as 78 is connected in a wye configuration between the signal coupling bank 88 and the substation transformer 58.

It should be noted at this point that if independent phase regulators are present, the capacitor bank 78 is connected between the voltage regulators and the substation transformer 58.

In the crosstalk attenuator application, a capacitor bank of smallest logistically convenient size is recommended. Such a capacitor bank equalizes the signal voltage among the phases by nearly shorting them together at carrier frequency, due to the very low reactance of the capacitors at carrier frequency. This forcing function causes the signal voltage on each power phase conductor to have very nearly the same amplitude and phase with respect to neutral, thus corresponding closely to the definition of a zero-sequence signal.

If independent, single-phase regulators are used, they will not ordinarily track each other because of unbalanced loading and differences in tap-change timing. If such regulators are interposed between the signal voltage equalizing capacitor bank and the substation transformer, the forced signal voltage equality is offset proportionately per phase by any differences in taps and would be transformed to a forced inequality of signal voltages among the phases as seen by the substation transformer, thus coupling more signal energy through the substation transformer to the transmission line and increasing any resulting crosstalk.

Therefore, to preserve maximum benefit of the equalizing effect of the capacitor bank on the signal voltages appearing at the substation transformer, the capacitor bank must be connected immediately to the substation transformer with any independent single-phase regulators farther downstream.

The signal coupling bank is typically connected through standard disconnect and protection means, to the distribution operating bus in the substation. It is of little consequence whether such regulators appear upstream of the signal coupling bank, as when regulating the entire substation operating bus, or downstream of the signal coupling bank, as when regulating (a) particular feeder(s) served by the operating bus.

When regulators are incorporated within the substation transformer, they are invariably three-phase coordinated (ganged together) under common control of a single tap changer mechanism. Thus, tap ratios are changed simultaneously and equally per phase and do not upset the equalizing effect of the capacitor bank.

This capacitor bank has individual capacitors 80, 82 and 84. The common wye-point in the capacitor bank is connected to an inductor or inductive element 86 which has its other end connected to neutral or ground 64. A signal coupling three-phase transformer bank 88 and associated signal generator 89 is shown connected on the downstream side of the capacitor bank (and optional voltage regulators 72 through 76) and provides a means of supplying zero-sequence carrier communication signals to the three-phase substation distribution network on the left side of FIG. 2. This transformer 88 and signal generator 89 combination is represented respectively by the inductance 16 and the signal means 18 in FIG. 1. The capacitor bank 78 and the inductor 86 are represented by elements 22 and 24 in FIG. 1. Finally, the inductance 12 in FIG. 1 is representative of the series inductance of the substation transformer 58 in FIG. 2. On the righthand side of FIG. 2 there is illustrated a further substation transformer 90 having a delta-connected primary winding 92 and a wye-connected secondary 94. The center or common wye-point of secondary winding 94 is connected to ground 96. The isolation afforded by transformers 58 and 90 remove concern for whether grounds 64 and 96 are at the same potential. However, both ground 64 and 96 in FIG. 2 are representatively the same as common ground 20 in FIG. 1.

The output leads of secondary 94 are connected to network distribution lines designated as 98, 100 and 102. A capacitor bank generally designated as 104 has individual capacitors 106, 108 and 110. The common wye-point of capacitor bank 104 is connected through an inductance 112 to ground 96. A set of voltage regulators generally designated as 114 are optionally connected in a manner previously discussed on the lefthand side of FIG. 2 to each of the lines 98, 100 and 102. On the downstream side from the capacitor bank 104 (and optional voltage regulators 114) is shown a signal coupling transformer generally designated as 116 receiving signal current from a carrier communication source 118 and within transformer 116 undergoing mode transformation from a simple single phase current to three equal zero-sequence-type substation distribution power line carrier communication signal currents which under balanced conditions will be exactly the same amplitude and phase in each of lines 98, 100, and 102.

As is well known to those skilled in the art, signal current transforms equally (but not necessarily signal voltage). Signal line currents and voltages are equal only if balanced conditions exist throughout. Signal currents in coupling bank windings are always equal irrespective of balance.

The element 118 in conjunction with transformer 116 is represented respectively by the elements 42 and 40 in FIG. 1. Further communication devices of either the receive-only nature, such as relays, or of the transceiver nature, such as meter reading and reporting devices, are not shown on either side of FIG. 2 but are represented by elements 28 and 46 as shown in FIG. 1.

OPERATION

As implied or specifically stated elsewhere in this specification the use of zero-sequence three-phase distribution power line carrier communication signals on a substation distribution network would theoretically never pass through the three-phase delta-wye transformer to the main power line. Further, even if a residual signal due to a degree of unbalance did pass to the power line, the amplitude would be so weak that it would not pass through another like substation transformer to interfere in any substantial manner with the similar communication networks on that substation distribution network. However, like too many theoretical solutions, it has been found in actual practice that unbalanced loads on the three-phase substation transformer will cause, in some instances, an appreciable amount of a supposedly balanced and canceling signal to pass through the substation transformer to the main transmission line. Then, if the conditions are favorable in terms of distance between substation transformers, etc., standing wave and related conditions can arise to reinforce the amplitude of this signal and cause substantial interference at given substations located at nodes of the generated standing wave signal.

The present invention through the use of the capacitor bank such as 78 physically located near the substation transformer 58 and upstream from any communications equipment, not only causes an attenuation of unbalanced components of the signal in the capacitor bank itself but in addition, significantly reduces the unbalance of the amplitude of the three power line communication carrier signals as applied per phase to the primary 62 of transformer 58 to likewise reduce the amplitude of any signals passing through transformer 58 but in addition, through the use of shunt inductor element 86, passes a considerable portion of these signals to neutral 64. Thus, without even considering further elements of the attenuation network, the capacitor bank 78 provides a considerable attenuation of unbalanced signals by itself and in combination with inductor element 86 provides even further attenuation. A side benefit is that this network provides a like attenuation of noise and undesired signals arriving at the substation from its own distribution network that would typically interfere with the communication frequency signals such that the amplitude of the signal generator can be increased somewhat along with increasing the sensitivity of any substation receivers to compensate for any reduction in signal amplitude caused by the attenuation network combination of 78 and 86.

However, when the shunt attenuation element combination 78 and 86 is considered in conjunction with the series impedance of the substation transformer 58 and the series impedance of the transmission lines shown as elements 12 and 10 in FIG. 1, the capacitor bank significantly reduces unbalanced signals arriving at the substation from the transmission line and an L-type attenuation network is presented to any communication signals arriving at the substation from the transmission line, to further reduce the likelihood of any interfering communication signals therefrom appearing on the distribution network. When a similar shunt element is used at a remote substation distribution network, that is experiencing particular crosstalk problems due to standing wave conditions, such as shown in either the righthand side of FIG. 2 or by the dash line block 34 in FIG. 1, this further shunt element combines with the previous mentioned series and shunt elements of FIG. 1 to form a pi-type attenuation network. In this type attenuation circuit, the signals from the lefthand portion of FIG. 1 not only are attenuated in being transmitted to the transmission line but are even further attenuated, after passing through the substation transformer represented by series inductance 30, by the shunt element 34 so that the signals are a very minimal amplitude by the time they reach the remote substation distribution network and the communication devices represented by elements 42 and 46 in FIG. 1.

While our solution to crosstalk problems may look reasonably simple after the fact, the crosstalk problem existed for a considerable period of time before a cost effective solution as shown was developed.

Although we have described a single embodiment of the inventive concept, we wish to not be limited to the embodiment illustrated but only by the scope of the appended claims wherein we claim:

1. The method of reducing crosstalk between three-phase power line carrier transceivers situated at two remote three-phase substation electric power distribution networks that are electrically interconnected through (i) a three-phase transmission line and (ii) substation transformers at opposite ends of the transmission line, where the transceivers are intended to communicate only with other communication devices within a given substation power distribution network, comprising the steps of:

capacitively coupling each of the three-phase lines of each distribution network together in a wye connection to form a capacitor bank at a point between the transceiver and the substation transformer at each substation experiencing substantial crosstalk where the capacitive values are such as to substantially block signals at the electric power frequency and provide substantially no blocking effect at the transceiver carrier frequency; and connecting the common point of said wye-connected capacitor bank to neutral through a shunt inductance where the inductance is of such a value that there is a high ratio of desired communication signal to crosstalk communication signal, the capacitor bank and shunt inductance at each distribution network at each end of the interconnecting electrical transmission line along with the intermediate reactances connecting the capacitor banks forming a three-phase balanced pi communication frequency attenuation circuit in which the capacitor bank and the associated shunt inductance at each distribution network form a series combination that is in shunt relationship with the main path of the communications signal in the associated distribution network.

2. Apparatus for reducing crosstalk interference between three-phase power line carrier transceivers situated at two remote three-phase substation electric power distribution networks that are electrically interconnected through (i) a three-phase transmission line and (ii) substation transformers at opposite ends of the transmission line, where the transceivers are intended to communicate only with only communication devices within a given substation power distribution network, comprising, in combination:

capacitive first means for capacitively coupling each of the three-phase lines of each distribution network together in a wye connection to form a capacitor bank at a point between the transceiver and the substation transformer at each substation experiencing substantial crosstalk where the capacitive values are such as to substantially block signals at the electric power frequency and provide substantially no blocking effect at the transceiver carrier frequency; and inductive second means, connected to said first means, for providing a shunt inductance between the common point of said wye-connected capacitor bank and neutral where the inductance is of such a value that there is a high ratio of desired communication frequency signal to crosstalk communication frequency signal, the first means and second means at each distribution network at each end of the interconnecting transmission line along with the intermediate transformer and transmission line inductances forming a three-phase balanced pi communication frequency attenuation circuit in which said first means and the associated second means connected thereto at each distribution network form a series combination that is in shunt relationship with the main path of the communications signal in the associated power distribution network.

3. The method of attenuating crosstalk between communication frequency transceivers which are respectively connected to remotely situated three-phase substation power distribution networks forming parts of a large low frequency three-phase electric power distribution system in which the networks are interconnected through a transmission line and substation transformers at opposite ends of the transmission line and in which the transceivers are intended to communicate with devices solely within the substation power distribution network, comprising the steps of:

capacitively coupling the three phases together in a wye-connected capacitor bank on the load side of the first associated substation transformer between the first associated substation transformer and the transceiver at a first interfering substation to partially rebalance the communication signal amplitudes as seen by said first associated substation transformer;

capacitively coupling the three phases together in a wye-connected capacitor bank on the load side of the second associated substation transformer between the second associated substation transformer and the transceiver at a second interfering substation to partially rebalance the communication signal amplitudes as seen by said second associated substation transformer and inductively coupling each of the capacitor bank common wye-points to neutral to form shunt elements which (i) in combination with the series inductance of the substation transformers and interconnecting transmission line, create a pi-type communication frequency attenuation network between crosstalk interfering transceivers and (ii) are in shunt relationship with the main path of the communications signal in the associated power distribution network.

4. Pi attenuator apparatus (a series element with a shunt element on each end) for attenuating communication frequency interference signals transmitted over a three-phase electric transmission line interconnecting through first and second substation transformers remotely situated first and second substation electrical power distribution networks, respectively, where said remotely situated substation power distribution networks have their own communication frequency signals superimposed on the low frequency distribution networks, comprising in combination:

first communication frequency shunt circuit element means, connected intermediate a first substation transformer and any communication equipment for the associated first electrical network, comprising a shunt inductor means coupled through a three-phase capacitor bank between the phase conductors of said associated first network and a neutral conductor, said first shunt circuit element means being in shunt relationship with the main path of the communications signal in the associated first network;

second communication frequency shunt circuit element means, connected intermediate a second substation transformer and any communication equipment for the associated second electrical network, comprising a shunt inductor means coupled through a three-phase capacitor bank between the phase conductors of said associated second network and a neutral conductor, said second shunt circuit element means being in shunt relationship with the main path of the communications signal in the associated second electrical network; and series element circuit means comprising the series combination of the series inductance of the remotely situated substation transformers and the intermediate transmission line.

5. Apparatus for attenuating crosstalk between communication frequency transceivers which are respectively connected to remotely situated three-phase substation power distribution networks forming a part of a large low frequency three-phase electric power distribution system in which the networks are interconnected through a transmission line and substation transformers at opposite ends of the transmission line and in which the transceivers are intended to communicate with devices solely within the associated substation power distribution network, comprising:

first means for capacitively coupling the three phases together in a wye-connected capacitor bank on the load side of the substation between the substation and the transceiver at a first interfering substation to partially rebalance the communication signal amplitudes as seen by the substation transformer of said first substation; and second means for capacitively coupling the three phases together in a wye-connected capacitor bank on the load side of the substation between the substation and the transceiver at a second interfering substation to partially rebalance the communication signal amplitudes as seen by the substation transformer of said second substation, and third means for inductively coupling each of the capacitor bank common wye-points to neutral to form, in combination with the inductance of the substation transformers and interconnecting transmission lines, a pi-type communication frequency attenuation network between crosstalk interfering transceivers in which the first and third means at the first substation and the second and third means at the second substation respectively form series combinations that are in shunt relationship with the main path of the communications signal in the associated substation distribution networks.

6. Apparatus for minimizing the amplitude of communication frequency signals, which are superimposed on lower frequency electric power lines for use only on a substation distribution network, which are passed through a three-phase substation transformer to a main power high voltage transmission line connected to the transformer on the opposite side thereof from said network, comprising, in combination:

three-phase wye-connected capacitor bank means, connected to the three-phase substation distribution network lines intermediate any communication equipment for that substation distribution network and the substation transformer for that substation distribution network having a capacitance which acts as a shunt to communication frequency signals; and shunt inductance means connected between a neutral point and the common wye-point in said wye-connected capacitor bank means, the capacitor bank and shunt inductance forming the shunt element of an L-type attenuator and the series inductance of the substation transformer and the main transmission line forming the series element of said L-type attenuator, said shunt element being in shunt relationship with the main path of the communication frequency signal in said substation distribution network.

7. Apparatus as claimed in claim 6 at each of two substation distribution networks which are interconnected through said transmission line and through substation transformers for the respective substations at opposite ends of said transmission line, where each of the capacitor banks and associated shunt inductances form a shunt element of a pi-type attenuator network, and the transformer and line inductances between the capacitor banks form the series element of said pi attenuator network, said shunt element in each network being in shunt relationship with the main path of the communication frequency signal in said associated network.

8. The combination of claim 2 in which the substation transformer associated with each distribution network comprises a primary winding of delta configuration connected in said transmission line and a secondary winding connected in the associated power distribution network.

9. The combination of claim 8 in which the secondary winding of each of said substation transformers is of a wye configuration and the wye point thereof is connected to neutral.

* * * * *